United States Patent [19]

Kiestra

[11] 4,016,832
[45] Apr. 12, 1977

[54] APPARATUS FOR DETERMINING THE QUANTITY OF MILK AND FOR DRAWING A SAMPLE DURING THE MILKING OF COWS

[76] Inventor: Philippus Pope Kiestra, Uilensprong 17, De Tijnje, Netherlands

[22] Filed: Sept. 4, 1975

[21] Appl. No.: 610,265

[30] Foreign Application Priority Data

Sept. 6, 1974 Netherlands .................... 7411888

[52] U.S. Cl. ...................... 119/14.14; 119/14.46
[51] Int. Cl.² ...................................... A01J 9/00
[58] Field of Search .......... 119/14.05, 14.14, 14.17, 119/14.18, 14.46

[56] References Cited

UNITED STATES PATENTS

| | | | |
|---|---|---|---|
| 2,868,167 | 1/1959 | Clark | 119/14.05 |
| 2,982,247 | 5/1961 | Varese et al. | 119/14.46 |
| 3,159,138 | 12/1964 | Olsson | 119/14.17 |
| 3,385,265 | 5/1968 | Schrader | 119/14.18 |

*Primary Examiner*—Hugh R. Chamblee
*Attorney, Agent, or Firm*—Marshall & Yeasting

[57] ABSTRACT

An apparatus for determining the quantity of milk and for drawing a milk sample during the milking of cows, whereby a frame having an upper wall, and upwardly open milk container being suspended by means of springs to the lower surface of said upper wall have been provided, which container is engageable by its upper edge via a seal against the upper wall of the frame, said upper wall having two connections within the upper edge of the milk container, which are adapted for connection to the hose of a milking cluster and to the milk conduit respectively, two valves being provided at the position of the connection to the milk conduit, one valve controlling the connection between a tube extending from the upper wall of the frame within the container to close to the container bottom and the milk conduit and the other valve controlling the connection between the volume in the container outside the tube and the milk conduit, the first-mentioned valve realizing in the closed position a connection between the tube and the atmosphere.

4 Claims, 8 Drawing Figures

4,016,832

APPARATUS FOR DETERMINING THE QUANTITY OF MILK AND FOR DRAWING A SAMPLE DURING THE MILKING OF COWS

BACKGROUND OF THE INVENTION

The invention relates to an apparatus for determining the quantity of milk and for drawing a milk sample per cow when milking cows.

In the milking of cows it is important to determine the total milk quantity obtained, which is delivered to the dairy factory, and the milk yield per cow as well as the fat content of the milk, since the amount paid and the production quality of the cow respectively depend on said information. Since the fat content per cow differs it is preferable to draw a sample during each milking operation. This sample is checked by inspectors of a central, e.g. district dairy institute. The invention seeks to provide an automatically operating apparatus whereby per milking operation and per cow the quantity of milk may be determined with an accuracy tolerance of not more than ±1% and which fills a small bottle with a sample whereafter the apparatus discharges the milk towards a collecting tank and thereafter is ready again for a new milking operation. It should be easy to clean the apparatus after all cows have been milked.

SUMMARY OF THE INVENTION

This is obtained according to the invention in that the apparatus is characterized by a frame having an upper wall, an upwardly open milk container being suspended by means of springs from the lower surface of said wall, the container being engageable with its upper edge through the intermediary of a seal with the frame upper wall, said upper wall having within the upper edge of the milk container two connections which are adapted for connection to the hose of a milking cluster and to the milk conduit respectively, two valves being provided at the position of the milk conduit connection, one valve controlling the connection between a tube extending from the upper wall of the frame within the container to close to the container bottom and the milk conduit, and the other valve controlling the connection between the volume of the container outside the tube and the milk conduit, the first-mentioned valve forming in its closed position a connection between the tube and the atmosphere.

During the milking operation, which is mechanical, the milking cluster, which is connected to the cow, is connected by a hose to the corresponding milk container connection, while the vacuum in the milk conduit extending to a common milk storage tank, said conduit being likewise connected to the milk container and including a suction pump, ensures that the milk container is sealingly pressed against the upper wall of the frame under the influence of the vacuum, which likewise prevails in the milk container, and of the tension in the suspension springs. The milk of the cow flows into the milk container. when a predetermined weight of milk is reached in the container, which is smaller than the usual minimum milk yield, this weight overrides together with the weight of the container the adjusted suspension force so that the container becomes suspended from the springs and a weighing operation takes place.

In that the determination of the quantity of milk is done by weighing no inaccuracies may arise as caused by differences in viscosity of the milk, which have a substantial influence when measurements are made by flow meters, while also variations in velocity of the milk flow have no influence.

With the apparatus according to the invention the connecting hoses with the milking cluster and the milk conduit remain connected to the operation during the weighing apparatus, but because they are connected to the frame they have no influence on the weighing results.

Preferably an upside down conical milk spreader is provided at the position of the milking cluster connection, at a short distance therebelow, around the tube which is coextensive with the centre line of the milk container. Thereby the flowing milk moves downwardly along the tube and the air, taken along with the milk, is separated therefrom and is discharged by the suction in the milk conduit.

For registering the measured milk quantity it is preferable if a drive for a transparant plate or drum having a calibrated graduation is provided on the milk container, the position of said plate or drum, which depends on the weight of the milk, may be registered by means of a light source and a film camera, while at the same time the registration number of the cow may be recorded on the film picture through an optical cable connected to the camera, from an identification label on the cow.

In order to be able to draw a sample of the milk in a sampling bottle at the time when the milk yield is collected in the milk container, a venturi with a bypass connection is according to the invention inserted in the connection between the milk container and the milk conduit, said bypass being connected upstream and downstream of the venturi and including a conical sampling holder, provided with a valve having two positions, said valve in one position opening the connection to the venturi and closing a discharge aperture in the bottom of the sampling holder, and in the other position closing the connection with the venturi and at the same time admitting air into the holder and closing the discharge aperture in the bottom, the arrangement being such that when the milk container is emptied a parallel flow passes through the sampling holder which is received in a sampling bottle during the next milking operation.

At the end of all milking operations the apparatus should be cleaned by means of a rinsing solution.

DESCRIPTION OF THE PREFERRED EMBODIMENT

Figure 1:
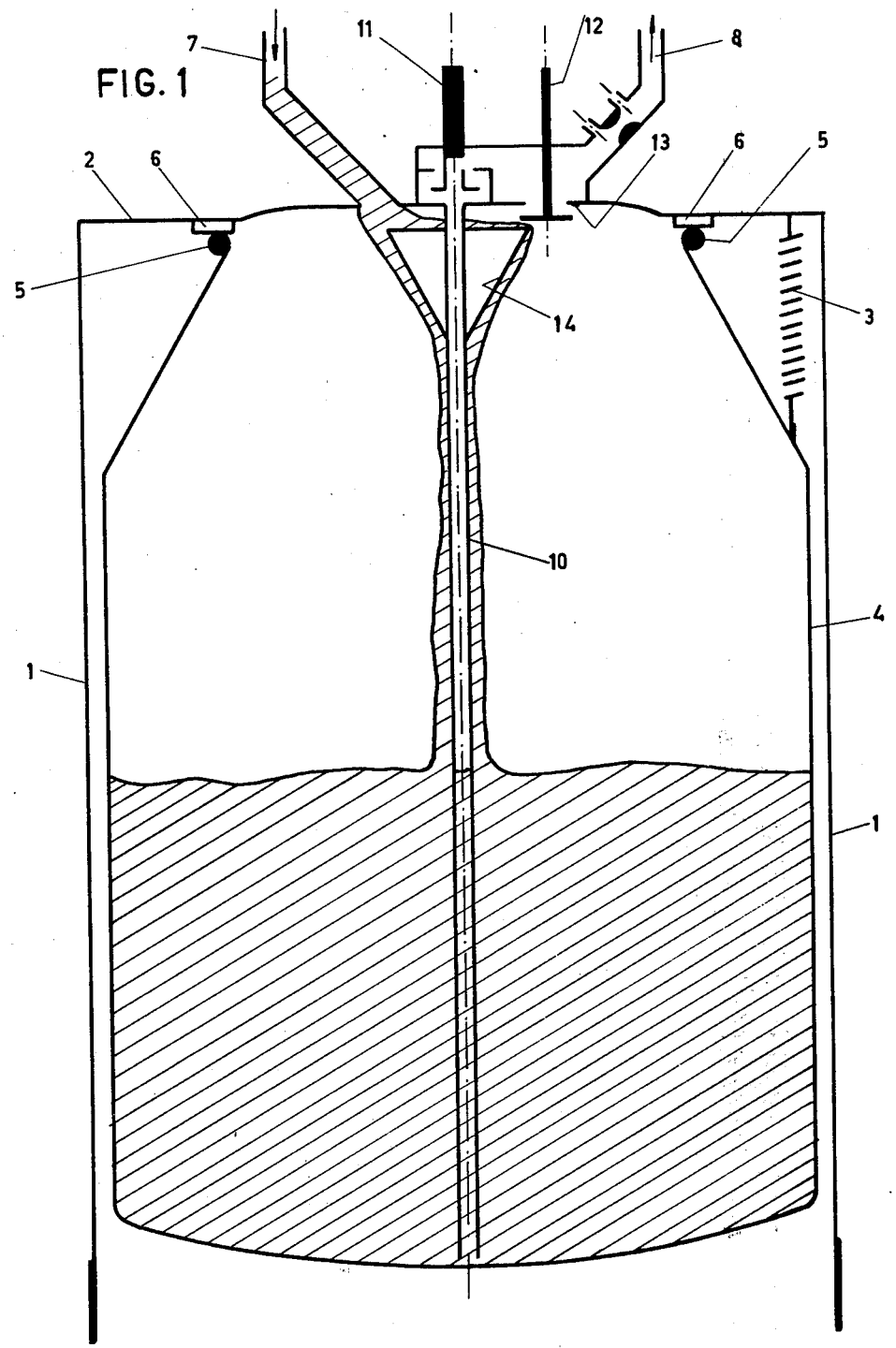
FIG. 1 shows a vertical section through the apparatus during the reception of the milk yield.

The apparatus shown comprises a frame 1 having a horizontal upper wall 2. A milk container 4 is suspended from the lower surface of the upper wall 2 by means of springs 3. As an example there may be three springs with mutual angular spacing of 120°. The milk container 4 is open at its upper end and the upper edge 5 engages as shown in FIG. 1 the lower surface of the upper wall 2 of the frame with the interposition of a ring 6 of rubber or plastic, which serves as a seal. Two connections open in the portion of the upper wall 2 of the frame within the upper edge of the milk container, namely a connection 7 realized by a small tube onto which a hose of the milking cluster, connected to a cow, may be slid, and a small tube 8, connected by a hose to the milk conduit which through a suction pump leads to a common storage tank for the milk.

The tube 8 is connected to a chamber 9 provided on top of the wall 2.

A vertical tube 10 extends downwardly in the vertical centre line of the milk container 4 from the upper wall of the frame to, in the position as shown in FIG. 1, close to the bottom of the milk container. Said tube is open at its lower as well as at its upper end. Over said tube 10 a valve 11 is situated in the chamber 9, said valve being adapted to close a seat over the upper aperture of the tube 10, but which valve is open in the position of FIG. 1. Likewise a valve 12 has been provided in the chamber 9, the valve closure means of which is adapted to close an aperture 13 in the upper wall 2 of the frame.

The operation is as follows: when the milking cluster and the milk conduit have been joined to the connecting tubes 7 and 8 respectively and the valves 11 and 12 are both open, the milk flows into the container under the influence of the suction in the milk conduit through the tube 7, the air present in the container and taken along with the milk being sucked off through the connection 8. Preferably an upside down conical milk spreader 14 has been provided around the tube 10 at its upper end, close to the lower surface of the upper frame wall 2, so that the milk flowing from the tube 7 contacts the cone 14 and thereby is made to flow uniformly downwardly along the tube 10. The air present in the milk can thereby escape easier.

The container 4 is kept with its upper edge 5 engaged with the ring 6 by the springs 3 together with a compression force obtained by the vacuum in the container, against gravity. The springs are designed such that the milk container is pressed with a force of about 0.5 kg against the closing edge. This weight is at the same time the minimum weight of milk in the container which can be weighed.

At the end of the milking operation the milking cluster is taken from the cow, while it closes itself and thereby also the tube 7 is closed. At the same time the valve 11 is closed (see FIG. 2). Thereby the tube 10 has been closed. The spindle of the valve 11 is partially hollow, namely in the part adjacent its valve closure and the hollow space 15 in the valve spindle has lateral aperture 16. In the closed position of the valve 11 according to FIG. 2 the aperture 16 is outside the chamber 9 whereby a communication is obtained between the atmosphere and the interior of the tube 10 so that air flows into the milk container 4 whereby the vacuum therein is cancelled. The air flows forcibly from the lower end of the tube 10 through the quantity of milk upwardly whereby the milk is strongly agitated whereafter the air escapes through the still open valve 13 towards the tube 8 and the milk conduit and is sucked off thereby. The air flow produces a mixing and homogenizing effect on the milk so that a representative sample may be taken therefrom when the milk container is emptied.

Figure 2:
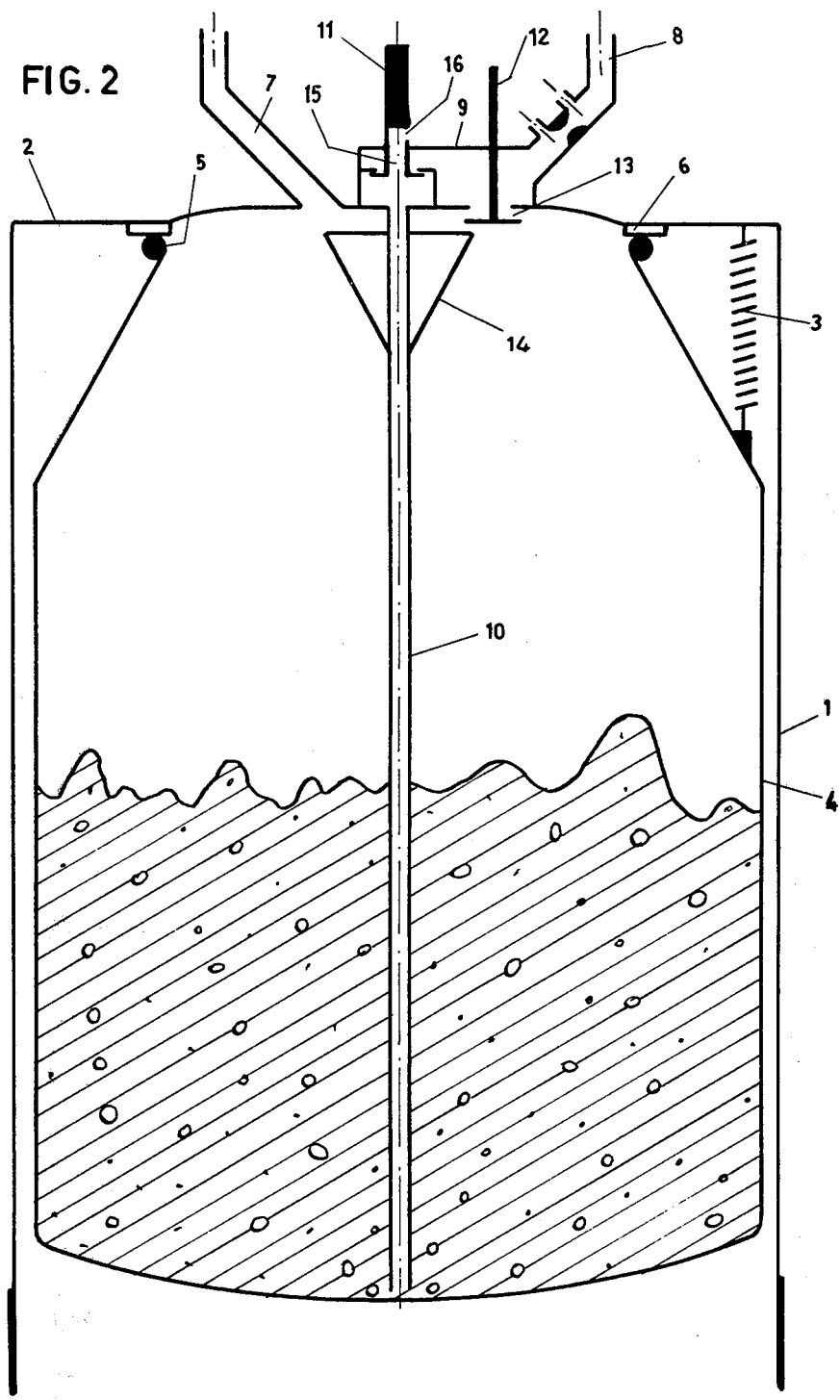
FIG. 2 shows the apparatus during the homogenisation of the milk.
Figure 3:
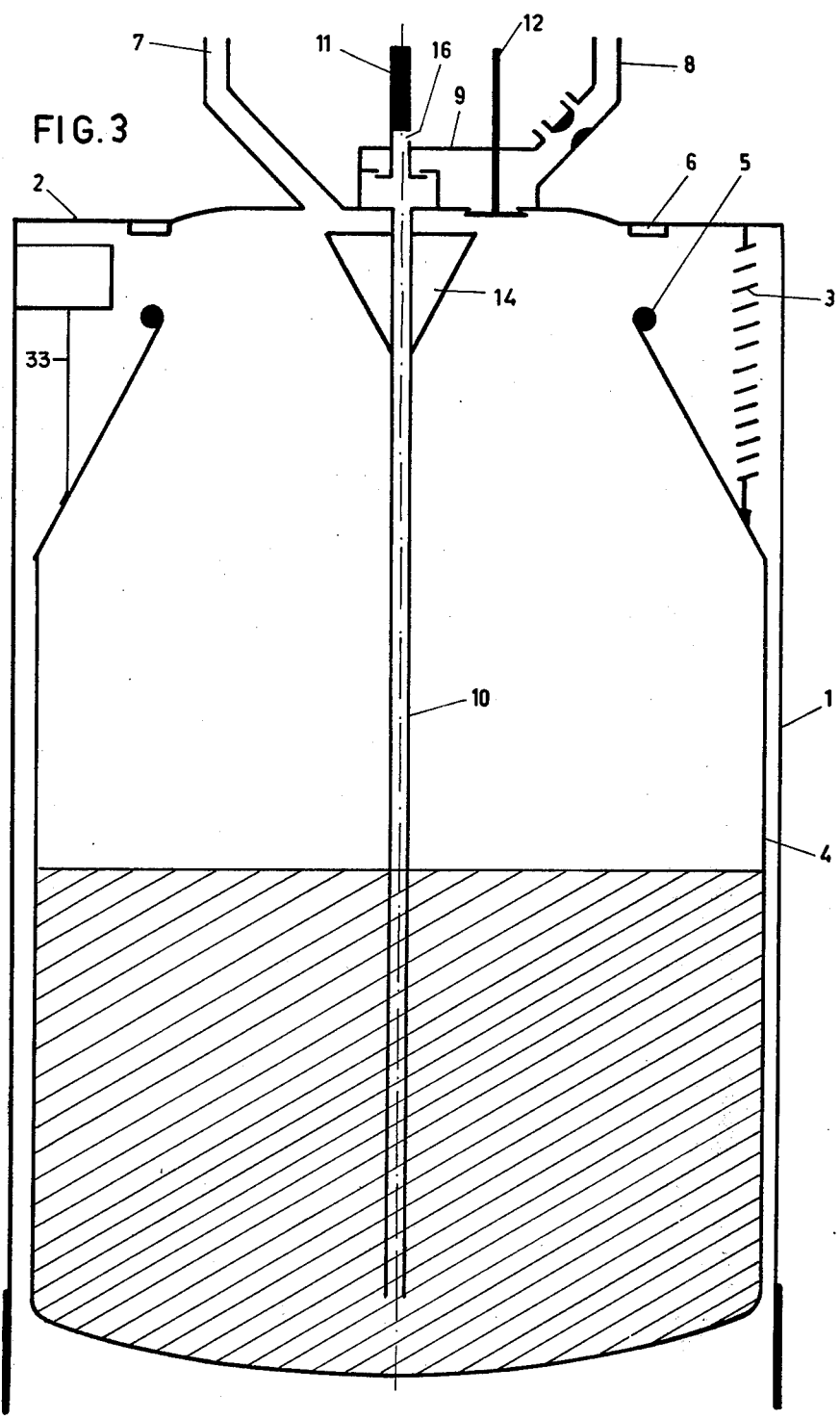
FIG. 3 shows the apparatus during weighing.

After the mixing operation according to FIG. 2 the weighing operation according to FIG. 3 takes place. Therefore the valve 11 is closed while the supply of air through the valve 11 is continued further until no vacuum is present any more over the milk in the milk container. Thereby the milk container falls downwardly and is stopped hanging on the springs, the fall distance being proportional to the weight of the milk in the container. This position is registered with a registering device to be described hereunder, which accurately determines the milk weight.

Thereafter the milk container may be emptied. This is done by opening the valve 11 while the valve 12 is kept closed. Since also the tube 7 is closed, via the tube 8 the milk is sucked off through the tube 10 and the valve 11. When the measuring container 4 is almost empty this is again fixedly engaged by the springs 3 with the upper wall 2, the quantity of air, which is still present in the container, being sufficient to drive also the rest of the milk from the container.

Figure 4:
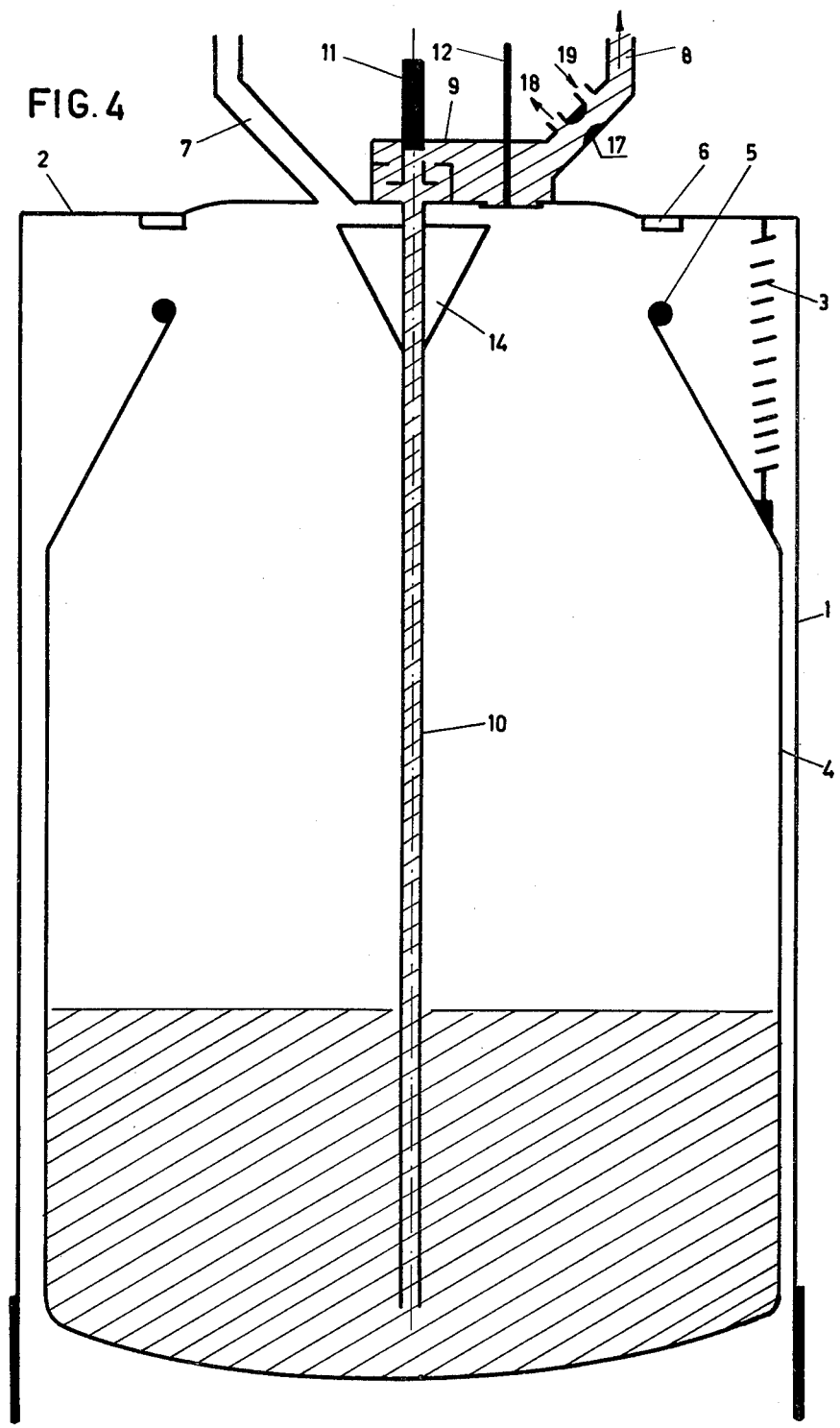
FIG. 4 shows the apparatus during the discharge of the milk towards the storage tank.
Figure 7:
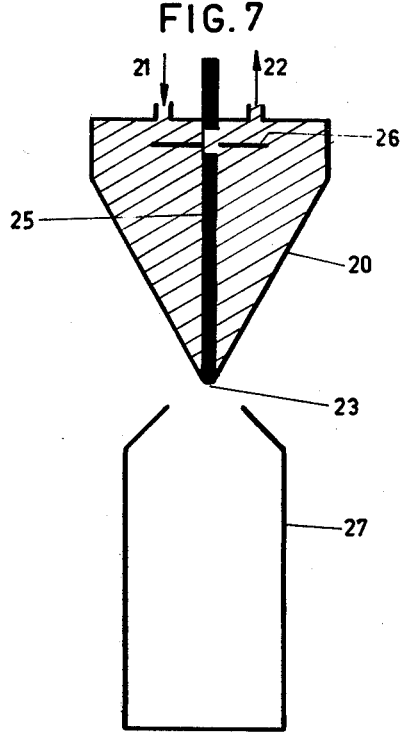
FIGS. 7 and 8 show the sampling holder together with a sampling bottle during the reception of the sample and during the discharge thereof into the bottle respectively.
Figure 8:
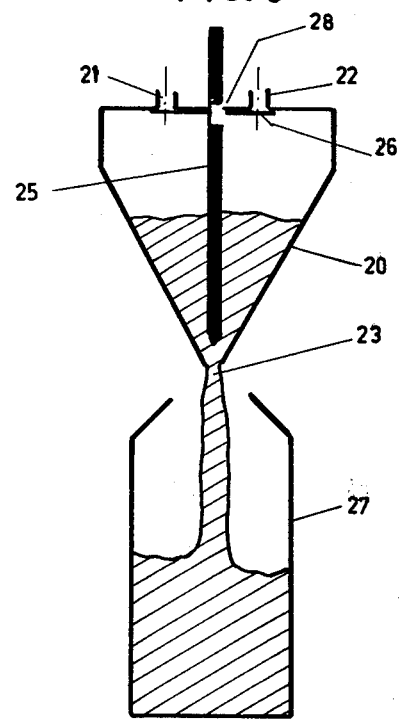

For drawing samples a venturi 17 has been provided in the tube 8, said venturi being connected through connecting conduits, which have not been shown, at points 18 and 19 in FIG. 4, in the direction of milk flow situated apertures and downstream respectively of the venturi 17, and thereby to a sample holder 20 as shown in FIGS. 7 and 8. Both connecting conduits are connected to apertures 21 and 22 in the upper wall of the sample holder 20. Said sample holder is upside down conical-shaped and has in its bottom a discharge aperture 23. A valve 24 has been provided in said sample holder 20, which valve has a shaft or spindle 25, the lower end of which forms the valve closure means for the aperture 23. At the same time the shaft 25 carries below the apertues 21, 22 within the holder 20 a valve closure means 26 which may close at the same time the apertures 21 and 22. In the position according to FIG. 7 the apertures 21, 22 are open and the aperture 23 is closed. Under the influence of the pressure difference along the venturi 17 a parallel flow of the milk is generated, which is discharged by the tube 8 via the aperture 18 to the aperture 21 in the holder 20 and when said holder is full, the milk is led via the apertures 22 and 19 back to the tube 8. A sample bottle 27 is placed below the holder 20. A circular rotary table may be provided on which a circle of sample bottles 27 has been placed, which rotary table may be indexed by means of automatic control for each milking operation.

After the milk container 4 has been emptied the valve 24 is actuated whereby the apertures 21, 22 are closed and the discharge aperture 23 is opened. In this position an aperture 28 in the valve spindle 25 adjacent to the valve closure means 26 produces a communication of the holder 20 with the atmosphere so that the air assists in letting the milk flow into the sample bottle 27.

After the valve 12 has been opened the apparatus is again in the position of FIG. 1 in which the milk of a next cow may be received.

Figure 5:
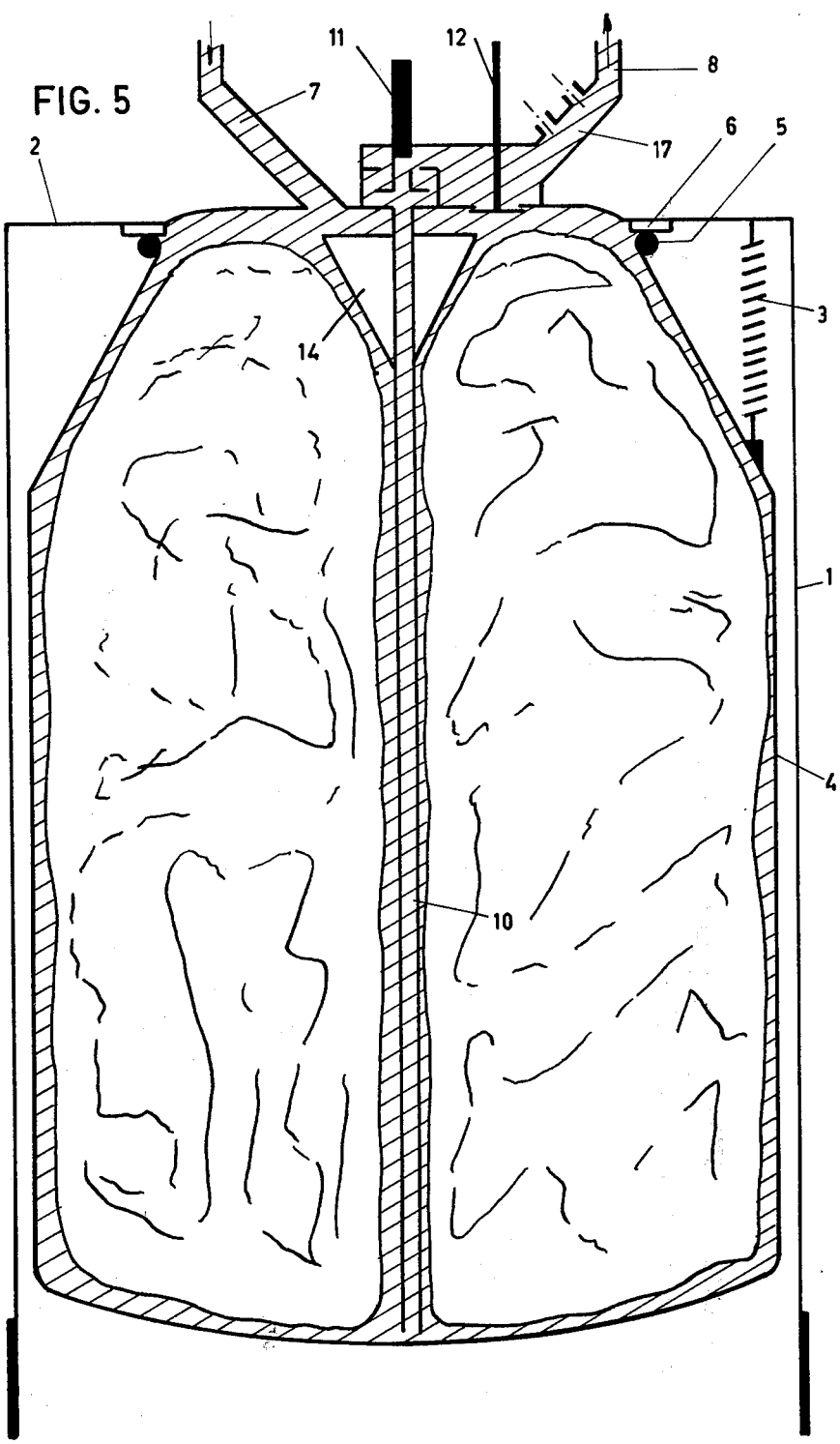
FIG. 5 shows the apparatus during rinsing.

At the end of all milking operations the valves are kept in the position for emptying, in which position the apparatus may be cleaned (FIG. 5). In this cleaning or rinsing position the valve 24 for drawing the samples is elevated and a rinsing liquid is supplied through the tube 7 and is discharged through the tube 10, the open valve 11, the chamber 9 and the tube 8. The rinsing liquid is supplied with great velocity, which might be done through the milking cluster which then is cleaned at the same time, and because of the great velocity the solution spreads over the spreading cone 14 and thoroughly rinses the interior of the measuring container 4 and the valve chamber 9.

The different valves as used may be diaphragm valves which may be controlled by means of a multiple-way valve and by pressure differences, but the valves may also be controlled by means of a program controller by an electromotor.

The contents of the sample holder 20 may for example be 10 cc and is adjusted to the contents of the sampling bottles which must contain the sample quantity as required by the official checking institute. In the sample holder from being included in a parallel branch of the discharge conduit of the milk container it is possible to prevent in a simple manner that the contents of a sample bottle is fed back into the milk flow, which might be dangerous because the bottles contain necessary conservation matter which is poisonous. It is possible and desirable, when rinsing the milk container, to clean at the same time the sample holder with valve, by keeping depressed the valve 24.

Figure 6:
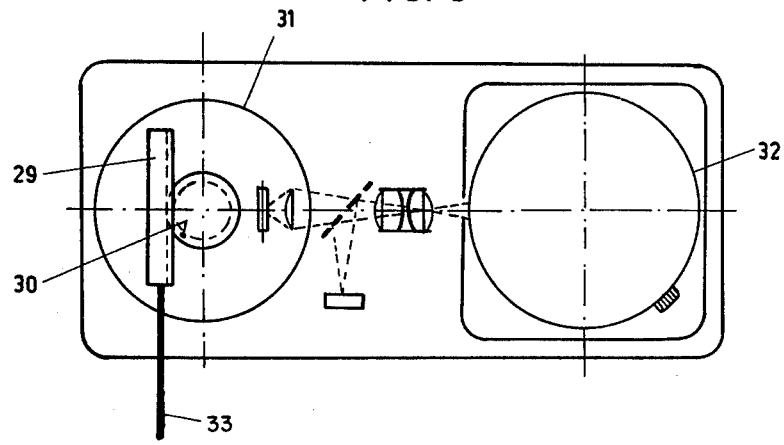
FIG. 6 is a schematic side view of the upper part of the frame of the apparatus showing the registration device.

FIG. 6 shows schematically the registration device. A rod 33 is connected to the measuring container 4, which rod ends in a rack 29 which is in engagement with a pinion 30. Said pinion 30 is secured to the shaft of a drum 31 which is transparant and carries graduations. The vertical position of the measuring container determines the rotational position of the drum 31, which is photographed by a camera 32 with film cartridge via lenses and a half transparant mirror. Because of said mirror a photographic picture is at the same time taken of a filament which gives the reference line relative to the graduations.

The apparatus may be constructed such that together with said position the identification number of the cow is also photographed on the same film. Therefor the cow carries a stainless steel band around a hind leg just above the lower joint. Said band is provided, beside a readable number, with a plurality of magnets in a predetermined configuration which likewise represents the number. The magnets are provided in a coined rectangular space provided thereto at a facing side of the band. Prior to milking each cow a detecting instrument is placed opposite to said magnets, which instrument contains a number of resistors which are sensitive to a magnetic field and represent a binary code of the cow number. The instrument is connected by a flexible conductor to the registration device so that the number is also registered on the photograph. For an identification label of this type reference is made to U.S. application Ser. No. 543,255 of the present applicant.

I claim:
1. An apparatus for determining the quantity of milk and for drawing a milk sample during the milking of cows, characterized by a frame (1) having an upper wall (2), an upwardly open milk container (4) being suspended by means of springs (3) to the lower surface of said upper wall, which container is engageable by its upper edge (5) via a seal (6) against the upper wall of the frame, said upper wall having two connections (7, 8) within the upper edge of the milk container, which are adapted for connection (7) to the hose of a milking cluster and to the milk conduit (8) respectively, two valves (11, 12) being provided at the position of the connection to the milk conduit, one valve (11) controlling the connection between a tube (10) extending from the upper wall (2) of the frame within the container (4) to close to the container bottom and the milk conduit (8) and the other valve (12) controls the connection between the volume in the container (4) outside the tube (10) and the milk conduit (8), the first-mentioned valve (11) realizing in the closed position a connection (16) between the tube (10) and the atmosphere.

2. An apparatus according to claim 1, characterized in that at the position of the connection (7) to the milking cluster and at short distance therebelow an upside down conical-shaped milk spreader (14) is provided around the tube (10) which is coaxial with the centre line of the milk container (4).

3. An apparatus according to claim 1, characterized in that a drive transmission (29, 30, 33) for a transparant plate or drum (31) with calibrated graduation has been provided on the milk container (4), the position of said plate or drum, which depends on the weight of the milk, may be registered with the intermediary of a light source and a film camera (32), while at the same time the registration number of the cow is received in the film picture through an optical cable, connected to the camera, from an identification label of the cow.

4. An apparatus according to claim 1, characterized in that a venturi (17) is included in the connection between the milk container (4) and the milk conduit (8), said venturi having a bypass connection (18, 21, 22, 19) which is connected upstream and downstream of the venturi and in which bypass connection a conical-shaped sample holder (20) is included, comprising a valve (24) having two positions, which valve in one position opens the connections to the venturi and closes a discharge aperture (23) in the bottom of the holder, and in the other position closes the connections to the venturi and at the same time admits air into the holder and opens the discharge aperture in the bottom, the arrangement being such that when the milk container (4) is emptied a parallel flow passes through the sample holder (20) which is received in a sample bottle (27) during the next milking operation.

* * * * *